United States Patent
Sonnier et al.

(10) Patent No.: US 9,195,464 B2
(45) Date of Patent: Nov. 24, 2015

(54) TRACKING WRITTEN ADDRESSES OF A SHARED MEMORY OF A MULTI-CORE PROCESSOR

(75) Inventors: David Sonnier, Austin, TX (US); Chris Randall Stone, Austin, TX (US); Charles Edward Peet, Jr., Austin, TX (US)

(73) Assignee: Intel Corporation, Santa Clara, CA (US)

( * ) Notice: Subject to any disclaimer, the term of this patent is extended or adjusted under 35 U.S.C. 154(b) by 783 days.

(21) Appl. No.: 13/316,145

(22) Filed: Dec. 9, 2011

(65) Prior Publication Data
US 2012/0084498 A1 Apr. 5, 2012

Related U.S. Application Data

(63) Continuation-in-part of application No. 12/782,379, filed on May 18, 2010, now Pat. No. 9,081,742, and a continuation-in-part of application No. 12/782,393, filed on May 18, 2010, now Pat. No. 8,255,644, which is a continuation-in-part of application No. 12/782,411, filed on May 18, 2010, now Pat. No. 8,407,707.

(51) Int. Cl.
| | |
|---|---|
| G06F 9/46 | (2006.01) |
| G06F 9/54 | (2006.01) |
| G06F 9/38 | (2006.01) |
| H04L 12/933 | (2013.01) |
| H04L 12/931 | (2013.01) |
| G06F 12/08 | (2006.01) |

(52) U.S. Cl.
CPC ............ *G06F 9/3834* (2013.01); *H04L 49/101* (2013.01); *H04L 49/109* (2013.01); *H04L49/506* (2013.01); *G06F 12/084* (2013.01); *G06F 12/0811* (2013.01); *G06F 2212/301* (2013.01)

(58) Field of Classification Search
CPC . G06F 9/3834; G06F 12/0811; G06F 12/084; G06F 2212/301
USPC ......................................... 712/11, 4; 711/144
See application file for complete search history.

(56) References Cited

U.S. PATENT DOCUMENTS

| | | | | |
|---|---|---|---|---|
| 7,577,792 | B2 * | 8/2009 | Hady et al. ..................... | 711/130 |
| 2003/0037154 | A1 * | 2/2003 | Poggio et al. ................. | 709/230 |
| 2003/0115417 | A1 | 6/2003 | Corrigan | |
| 2005/0021871 | A1 * | 1/2005 | Georgiou et al. ............. | 709/250 |

OTHER PUBLICATIONS

Carr et al., "Automatic Data Partitioning for the Agere Payload Plus Network Processor", CASES '04 Proceedings of the 2004 international conference on compilers, architecture, and synthesis for embedded systems, pp. 238-247.*
Karp et al., "Hardware Assist for Data Merging for Shared Memory Multiprocessor", Hewlett-Packard Labs, Mar. 13, 1994, pp. 1-14.*
Hennessy, "Computer Architecture, A Quantitative Approach", 2003, Morgan Kaufamnn Publishers, 3rd Ed., pp. 658-670, 728-735.*
Alan H. Karp and Rajiv Gupta, "Hardware Assist for Data Merging for Shared Memory Multiprocessors," Hewlett-Packard Labs, Palo Alto, CA, Mar. 13, 1994, pp. 1-14.

* cited by examiner

*Primary Examiner* — Andrew Caldwell
*Assistant Examiner* — Yuqing Xiao
(74) *Attorney, Agent, or Firm* — Nicholson De Vos Webster & Elliott LLP (57) ABSTRACT

Described embodiments provide a method of controlling processing flow in a network processor having one or more processing modules. A given one of the processing modules loads a script into a compute engine. The script includes instructions for the compute engine. The given one of the processing modules loads a register file into the compute engine. The register file includes operands for the instructions of the loaded script. A tracking vector of the compute engine is initialized to a default value, and the compute engine executes the instructions of the loaded script based on the operands of the loaded register file. The compute engine updates corresponding portions of the register file with updated data corresponding to the executed script. The tracking vector tracks the updated portions of the register file. The compute engine provides the tracking vector and the updated register file to the given one of the processing modules.

20 Claims, 5 Drawing Sheets

TRACKING WRITTEN ADDRESSES OF A SHARED MEMORY OF A MULTI-CORE PROCESSOR

CROSS-REFERENCE TO RELATED APPLICATIONS

This application claims the benefit of the filing date of U.S. provisional application No. 61/426,857, filed Dec. 23, 2010, the teachings of which are incorporated herein in their entireties by reference.

This application is a continuation-in-part, and claims the benefit of the filing date, of U.S. patent application Ser. No. 12/782,379 filed May 18, 2010, Ser. No. 12/782,393 filed May 18, 2010, and Ser. No. 12/782,411 filed May 18, 2010, the teachings of which are incorporated herein in their entireties by reference.

The subject matter of this application is related to U.S. patent application Ser. No. 12/430,438 filed Apr. 27, 2009, Ser. No. 12/729,226 filed Mar. 22, 2010, Ser. No. 12/729,231 filed Mar. 22, 2010, Ser. No. 12/963,895 filed Dec. 9, 2010, Ser. No. 12/971,742 filed Dec. 17, 2010, Ser. No. 12/974,477 filed Dec. 21, 2010, Ser. No. 12/975,823 filed Dec. 22, 2010, Ser. No. 12/975,880 filed Dec. 22, 2010, Ser. No. 12/976,045 filed Dec. 22, 2010, Ser. No. 12/976,228 filed Dec. 22, 2010, Ser. No. 12/979,551 filed Dec. 28, 2010, Ser. No. 12/979,665 filed Dec. 28, 2010, Ser. No. 12/979,800 filed Dec. 28, 2010, Ser. No. 13/046,717 filed Mar. 12, 2011, Ser. No. 13/046,719 filed Mar. 12, 2011, Ser. No. 13/046,726 filed Mar. 12, 2011, Ser. No. 13/192,104 filed Jul. 27, 2011, Ser. No. 13/192,140 filed Jul. 27, 2011, Ser. No. 13/192,187 filed Jul. 27, 2011, Ser. No. 13/232,422 filed Sep. 14, 2011, Ser. No. 13/250,898 filed Sep. 30, 2011, Ser. No. 13/274,726 filed Oct. 17, 2011 and Ser. No. 13/310,961 filed Dec. 5, 2011, the teachings of which are incorporated herein in their entireties by reference.

BACKGROUND OF THE INVENTION

1. Field of the Invention

The present invention relates to communication systems, in particular, to operations for testing encryption and decryption datapaths of an accelerated processor architecture for packet networks.

2. Description of the Related Art

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors diminished performance improvements, or actually slowed down overall network processor throughput. Newer designs add hardware accelerators to offload certain tasks from the general-purpose processors, such as encryption/decryption, packet data inspections, and the like. These newer network processor designs are traditionally implemented with either i) a non-pipelined architecture or ii) a fixed-pipeline architecture.

In a typical non-pipelined architecture, general-purpose processors are responsible for each action taken by acceleration functions. A non-pipelined architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence. In a typical fixed-pipeline architecture, packet data flows through the general-purpose processors and/or accelerators in a fixed sequence regardless of whether a particular processor or accelerator is required to process a given packet. This fixed sequence might add significant overhead to packet processing and has limited flexibility to handle new protocols, limiting the advantage provided by using the accelerators.

Network processors implemented as a system on chip (SoC) having multiple processing modules might make data available for processing to more than one processing module. In such instances, if shared data is modified by one processing module, this might affect what processing should be performed by another of the processing modules. Further, shared data should be updated coherently between the multiple processing modules. Thus, there is a need to accurately and efficiently determine modified portions of shared data of an SoC.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a method of controlling processing flow in a network processor having one or more processing modules. A given one of the processing modules loads a script into a compute engine. The script includes one or more instructions for the compute engine. The given one of the processing modules loads a register file into the compute engine. The register file includes one or more operands for the instructions of the loaded script. A tracking vector of the compute engine is initialized to a default value, and the compute engine executes the instructions of the loaded script based on the operands of the loaded register file. The compute engine updates corresponding portions of the register file with updated data corresponding to the executed script. The tracking vector tracks the updated portions of the register file. The compute engine provides the tracking vector and the updated register file to the given one of the processing modules.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Described embodiments of the present invention provide a method of controlling processing flow in a network processor having one or more processing modules. A given one of the processing modules loads a script into a compute engine. The script includes one or more instructions for the compute engine. The given one of the processing modules loads a register file into the compute engine. The register file includes one or more operands for the instructions of the loaded script. A tracking vector of the compute engine is initialized to a default value, and the compute engine executes the instructions of the loaded script based on the operands of the loaded register file. The compute engine updates corresponding portions of the register file with updated data corresponding to the executed script. The tracking vector tracks the updated portions of the register file. The compute engine provides the tracking vector and the updated register file to the given one of the processing modules.

Table 1 defines a list of acronyms employed throughout this specification as an aid to understanding the described embodiments of the present invention:

TABLE 1

| USB | Universal Serial Bus | FIFO | First-In, First-Out |
|---|---|---|---|
| SATA | Serial Advanced Technology Attachment | I/O | Input/Output |
| SCSI | Small Computer System Interface | DDR | Double Data Rate |
| SAS | Serial Attached SCSI | DRAM | Dynamic Random Access Memory |
| PCI-E | Peripheral Component Interconnect Express | MMB | Memory Manager Block |
| SRIO | Serial RapidIO | CPU | Central Processing Unit |
| SoC | System-on-Chip | μP | Microprocessor |
| AXI | Advanced eXtensible Interface | PLB | Processor Local Bus |
| AMBA | Advanced Microcontroller Bus Architecture | MPP | Modular Packet Processor |
| PAB | Packet Assembly Block | SED | Stream Editor |
| MTM | Modular Traffic Manager | CE | Compute Engine |
| BWTV | Byte Written Tracking Vector | RF | Register File |
| TCP | Transmission Control Protocol | CRC | Cyclic Redundancy Check |
| API | Application Programming Interfaces | UART | Universal Asynchronous Receiver/Transmitter |
| SWD | Serial Wire Debug | JTAG | Joint Test Action Group |
| IP | Internet Protocol | SLIP | Serial Line Internet Protocol |

Figure 1:
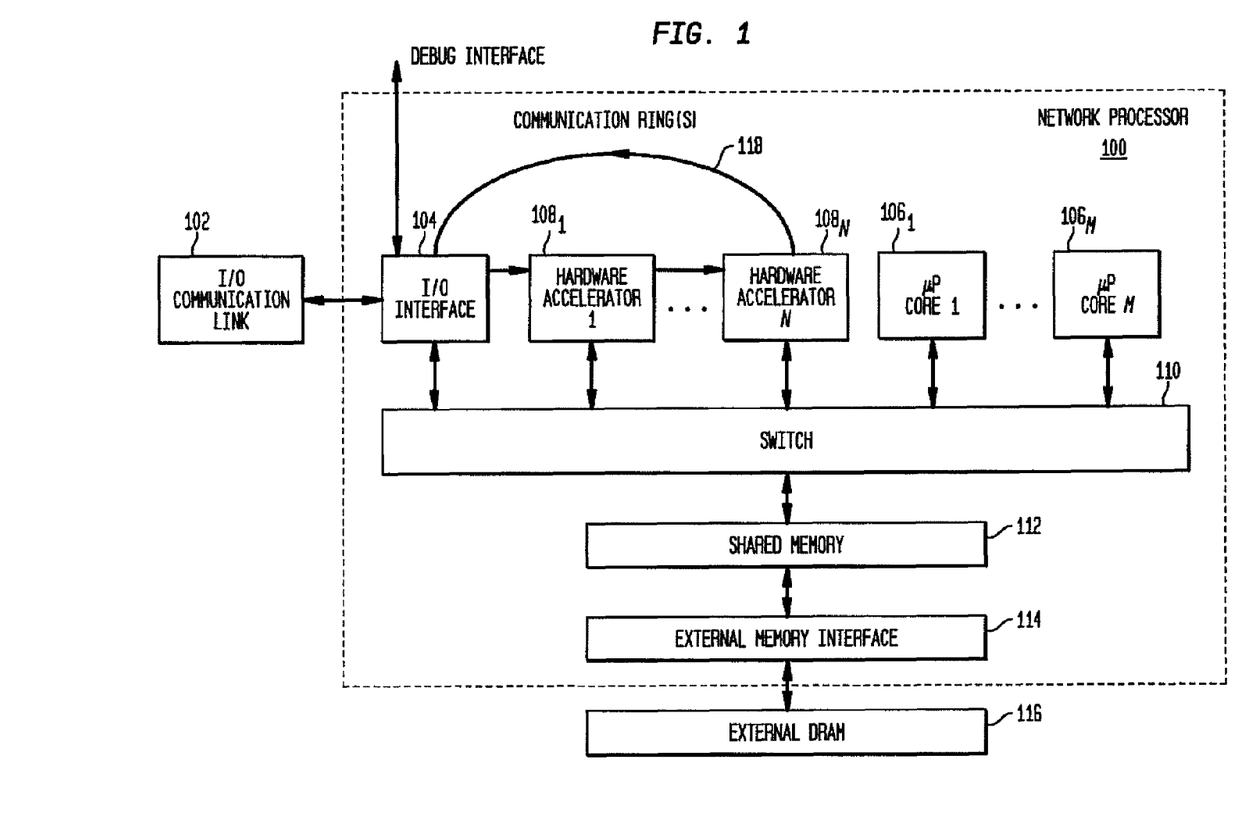
FIG. 1 shows a block diagram of a network processor operating in accordance with exemplary embodiments of the present invention.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (μP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, μP cores and hardware accelerators might be coupled through switch 110 to shared memory 112. Switch 110 might be implemented as a non-blocking crossbar switch such as described in related U.S. patent application Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various μP cores 106 and hardware accelerators 108. External memory interface 114 couples shared memory 112 to one or more external memories, shown as external memory 116, to provide off-chip storage of data not currently in use by the various μP cores 106 and hardware accelerators 108 to free space in shared memory 112. Hardware accelerators 108 might interact with each other, for example, by one or more communication bus rings 118 that pass "tasks" from a source core to a destination core. As described herein, tasks are instructions to the destination core to perform certain functions, and a task might contain address pointers to data stored in shared memory 112, as described in related U.S. patent application Ser. Nos. 12/782,379, 12/782,393, and 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112.

I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted out of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various μP cores 106 and hardware accelerators 108 of network processor 100 might include several exemplary types of processors or accelerators. For example, the various μP cores 106 might be implemented as Pentium® or Power PC® processors, or a combination of different processor types (Pentium® is a registered trademark of Intel Corporation, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions. The MTM might operate substantially as described in related U.S. patent application Ser. No. 13/232,422, filed Sep. 14, 2011 and Ser. No. 13/250, 898 filed Sep. 30, 2011, which are incorporated by reference herein.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The RegEx engine is a packet search engine for state-based cross-packet pattern matching. The RegEx engine is multi-threaded accelerator. An exemplary RegEx engine might be implemented such as described in U.S. Pat. Nos. 7,439,652 and 7,899,904, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 might be dynamically allocated by the MMB to store data, with the blocks in one of the following sizes: 256, 2048, 16384, and 65536 bytes. The MMB might operate substantially as described in related U.S. patent application Ser. No. 12/963,895 filed Dec. 9, 2010, which is incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, which is incorporated by reference herein.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010, which are incorporated by reference herein. The MPP might also include hash functionality such as described in related U.S. patent application Ser.

Nos. 13/046,717, 13/046,719, and 13/046,726 all filed Mar. 12, 2011, which are incorporated by reference herein.

Figure 2:
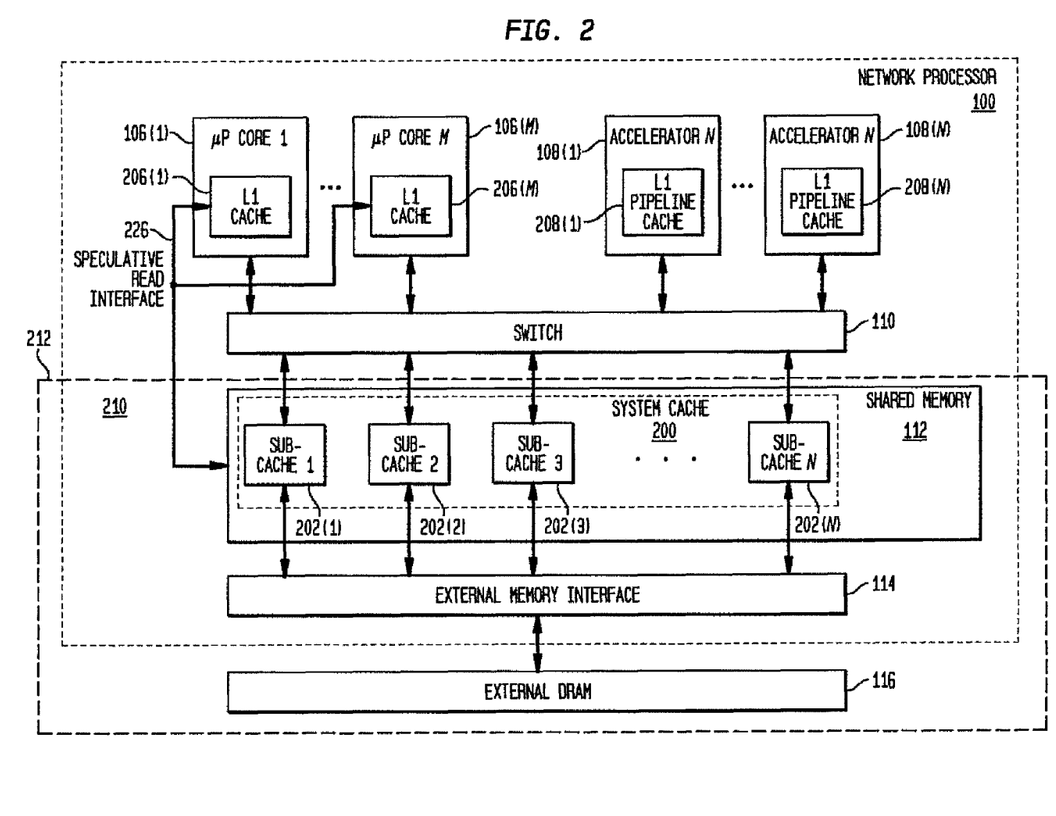
FIG. 2 shows a block diagram of a system cache of the network processor of FIG. 1, in accordance with embodiments of the present invention.

FIG. 2 shows a block diagram of an exemplary embodiment of system cache 200 of network processor 100, in accordance with embodiments of the present invention. As shown in FIG. 2, system cache 200 might be implemented in shared memory 112. System cache 200 might include one or more individual caches, shown as caches 202(1)-202(N). Caches 202(1)-202(N) might be employed to cache data from any μP core or accelerator (e.g., μP cores 106 or accelerators 108) of network processor 100. In particular embodiments, system cache 200 might be employed to store packet data from μP cores 106 or accelerators 108. As described in related U.S. patent application Ser. No. 12/782,379, 12/782,393, and 12/782,411, which are incorporated by reference herein, caches 202(1)-202(N) might be addressed via switch 110 in such a way as to balance access to the caches, referred to herein as striping, helping to avoid hot spots in shared memory 112, improve performance of the caching in and out of external memory 116, and reduce cache access bottlenecks. As indicated by dashed line 212, shared memory 112 and external memory 116 might generally be referred to as system memory 210. In embodiments of the present invention, each cache 202(1)-202(N) might form a memory array, and the number of system caches might preferably be implemented as a power of two. One or more memory blocks might be allocated to each cache 202(1)-202(N). In embodiments of the present invention, each cache 202(1)-202(N) might be implemented as an N-way associative cache employing a least recently used (LRU) caching algorithm. In some embodiments, each cache 202(1)-202(N) might have a total size of 512 kB and a cache line length of 256 B.

As shown in FIG. 2, each of the μP cores 106(1)-106(M) might typically have a corresponding level one (L1) cache, shown as L1 caches 206(1)-206(M). The L1 caches 206(1)-206(M) of the respective μP cores 106(1)-106(M) can communicate with the shared memory 112 via a speculative read interface 226. Each of the μP cores 106 might also include a level two (L2) cache (not shown). Such L1 and L2 caches might be implemented in accordance with the processor design of each μP core 106, for example a Power PC® processor implementation. The various μP cores 106 might be in communication with one another via a communication bus of network processor 100, for example, a Processor Local Bus (PLB), which is a microprocessor bus architecture introduced by IBM, or an Advanced eXtensible Interface (AXI), which is a higher frequency implementation of the Advanced Microcontroller Bus Architecture (AMBA) introduced by ARM Ltd. Also as shown in FIG. 2, one or more of accelerators 108 might have one or more corresponding local L1 pipeline caches, shown as L1 pipeline caches 208(1)-208(N). The function of L1 pipeline caches 208(1)-208(N) is to act as an interface to system cache 200 for accelerators 108 of network processor 100. The term "pipeline" is used since L1 pipeline caches 208(1)-208(N) might typically be employed only for certain ones of accelerators 108 that access system cache 200 as part of an execution pipeline. The operation of system cache 200, shared memory 112 and external memory 116 might be substantially as described in related U.S. patent application Ser. Nos. 13/192,104, 13/192,140 and 13/192,187, all filed Jul. 27, 2011, which are incorporated by reference herein.

Embodiments of the present invention might provide a compute engine (CE) in one or more of hardware accelerators 108, depending on the functionality of each accelerator. For example, accelerators such as the SED, MPP and MTM might commonly employ one or more CEs to perform various functions. Each CE is a general purpose arithmetic logic unit (ALU) predicate execution unit that might include one or more ALUs and one or more predicate units. A CE might typically be employed to perform packet modification processing, scheduling, and state specific data gathering and classification. The CE might be pipelined to perform arithmetic and logical operations upon operands contained in a register file based upon instructions of a given script. The one or more predicate units perform condition code predicate vector operations and branching operations of the CE, while the one or more ALUs perform arithmetic operations of the CE.

Figure 3:
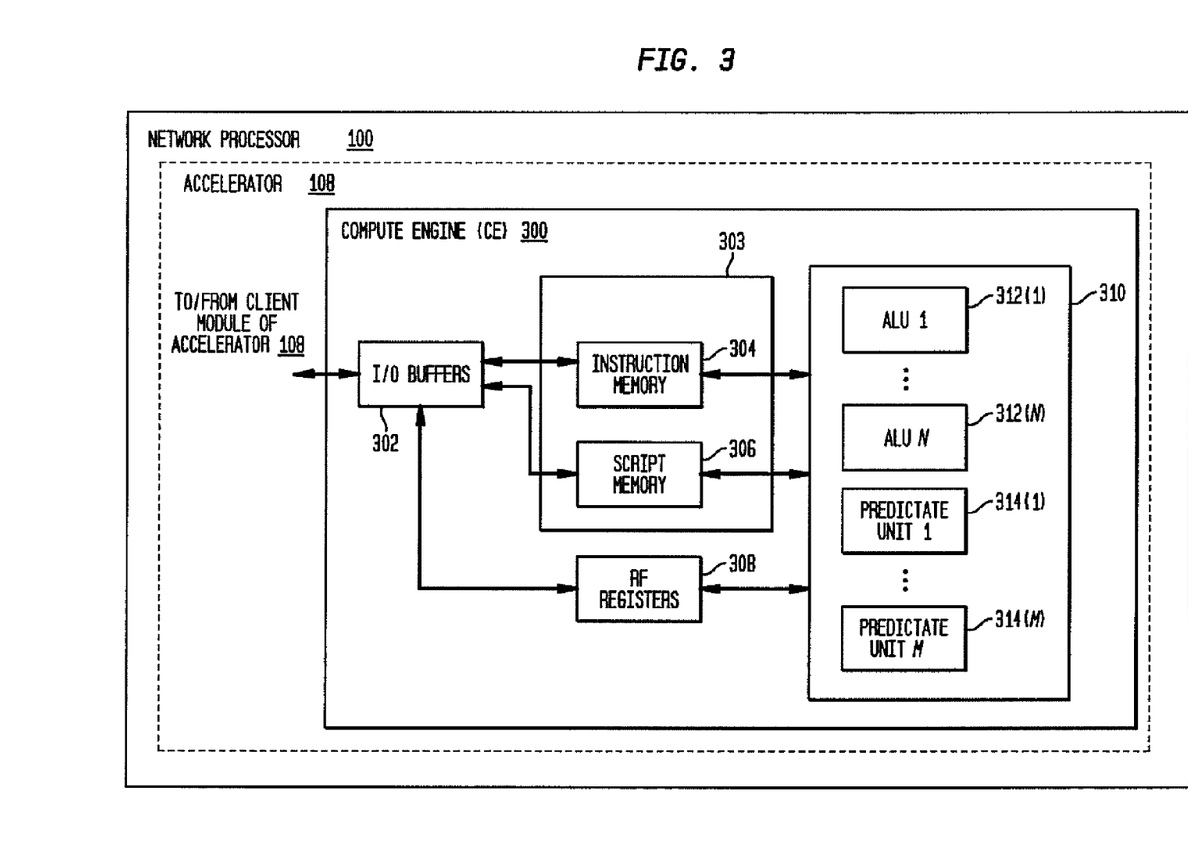
FIG. 3 shows a block diagram of a compute engine (CE) of the network processor of FIG. 1, in accordance with embodiments of the present invention.

FIG. 3 shows a block diagram of an exemplary embodiment of CE 300. As shown in FIG. 3, CE 300 is a sub-module of a given accelerator 108. CE 300 is in communication with one or more other sub-modules of accelerator 108 via I/O buffer 302. I/O buffer 302 is in communication with CE memory 303 and one or more register file (RF) registers 308. CE memory 303 includes instruction memory 304 and script memory 306. Typically, CE memory 303 might be implemented as an embedded RAM. One or more scripts for operation of CE 300 might be stored in script memory 306. Each script might contain one or more instructions, each instruction corresponding to an instruction stored in instruction memory 304.

CE 300 might process one or more scripts for a given task of network processor 100. Each instruction might operate on one or more operands stored in a register file loaded into RF registers 308. For example, scripts typically are employed to perform ALU operations that might generally be of the form B op C=A, where B and C are register file operands, op is the instruction, and A is the result of the operation. In some embodiments, A, B, and C might vary from 1 to 4 bytes in size. At the end of script execution by CE processing unit 310, the register file contains the final results of the script execution. The given hardware accelerator 108 might employ the modified register file for subsequent processing. This subsequent processing might vary based on which fields of the register file are modified by the script. For example, based on the modified register file data, a task corresponding to the script operation might be directed to a different resource of network processor 100 for subsequent processing, or data corresponding to the task might be modified based on the modified register file data.

CE memory 303 and RF registers 308 are in communication with CE processing unit 310. CE processing unit 310 includes one or more ALUs 312(1)-312(N) and one or more predicate units 314(1)-314(M). Each instruction might include variable width ALU and predicate data fields for controlling execution flow of CE processing unit 310. In some embodiments, the operations might be 32 bit operations, and the register file might be a 256 byte file. Each CE might employ 64 32-bit registers to independently load, modify, and unload a given register file from RF registers 308.

In some embodiments, each CE might include up to 4 ALUs and 4 predicate units (e.g., N is equal to 4 and M is equal to 4). Each ALU might operate on a unique instruction stream allowing parallel execution. The corresponding hardware accelerator 108 might control loading a register file from system memory 200 to RF registers 308, and might also load a given script for execution by CE processing unit 310 to script memory 306 from system memory 200. If execution of the script by CE processing unit 310 causes the loaded register file to be modified, the modified register file might be written back to system memory 200 from RF registers 308.

The register file might be selectably loaded into 8, 16, 24, 32, 40, 48, 56 or 64 registers of RF registers 308, depending on the desired operation.

Figure 4:
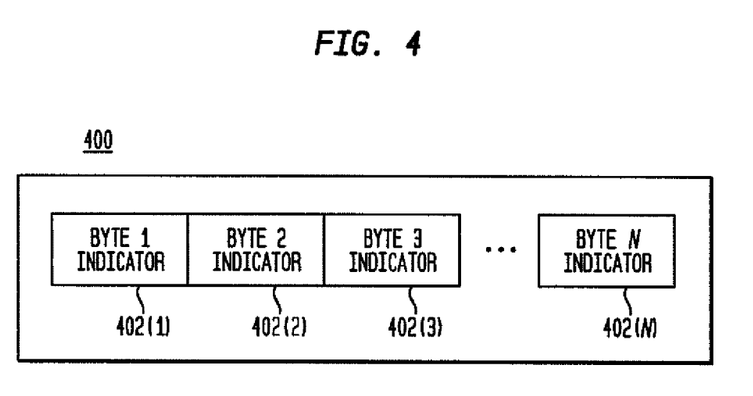
FIG. 4 shows a block diagram of a byte written tracking vector of the CE of FIG. 3, in accordance with embodiments of the present invention.

Each CE that executes a script on a register file might track, at a byte level, when data of the register file is modified by the script. A Byte Written Tracking Vector (BWTV) might be employed to indicate which portions of the register file have been modified. FIG. 4 shows an exemplary embodiment of BWTV 400. As shown in FIG. 4, BWTV 400 includes up to N indicators, 402(1)-402(N), wherein N corresponds to the number of portions of the register file that are monitored for modification by a script. Each indicator 402(1)-402(N) indicates whether a corresponding portion of the register file has been modified by the script. As shown in FIG. 4, the portions might be each byte of the register file, such that N is the number of bytes of the register file. In some embodiments, each indicator 402(1)-402(N) might include a 1 bit flag corresponding to each byte of the register file. Initially, the BWTV is "zeroed" at the start of a script execution by CE processing unit 310. While a script is executed by CE processing unit 310, RF registers 308 are monitored for valid write operations to one or more addressed bytes of the register file. Valid writes cause the corresponding indicators 402(1)-402(N) to be set to a 1, indicating that the data in the corresponding portion of the register file was modified by the script. At the end of script execution by CE processing unit 310, BWTV 400 represents all bytes that have been modified or written within the register file. In some embodiments, BWTV 400 might be one or more reserved registers of RF registers 308, or alternatively, might be stored in CE memory 303.

To determine whether the register file is modified by the script execution, the given accelerator 108 might query BWTV 400 on either an indicator by indicator basis, or in a contiguous range of indicators 402(1)-402(N). This alleviates accelerator 108 from specifically comparing actual data values of the register file before and after script execution to determine if a given byte or range of bytes of the register file were modified by the script execution. In described embodiments, multiple write operations during a single script execution to a given byte of the register file byte are data independent since data comparisons are not performed. For example, if byte 4 of the register file is written multiple times during a script execution, the indicator of BWTV 400 corresponding to byte 5 of the register file is set during the first write operation, and remains set, regardless of the value of byte 5 of the register file for the subsequent write operations. Employing the BWTV allows a client processing module to maintain coherency of data in the register file, such that if a particular byte or range of bytes of the register file are modified, then the client processing module might update local caches (e.g., caches 206) or system memory 200 corresponding to the updated data in the register file.

Figure 5:
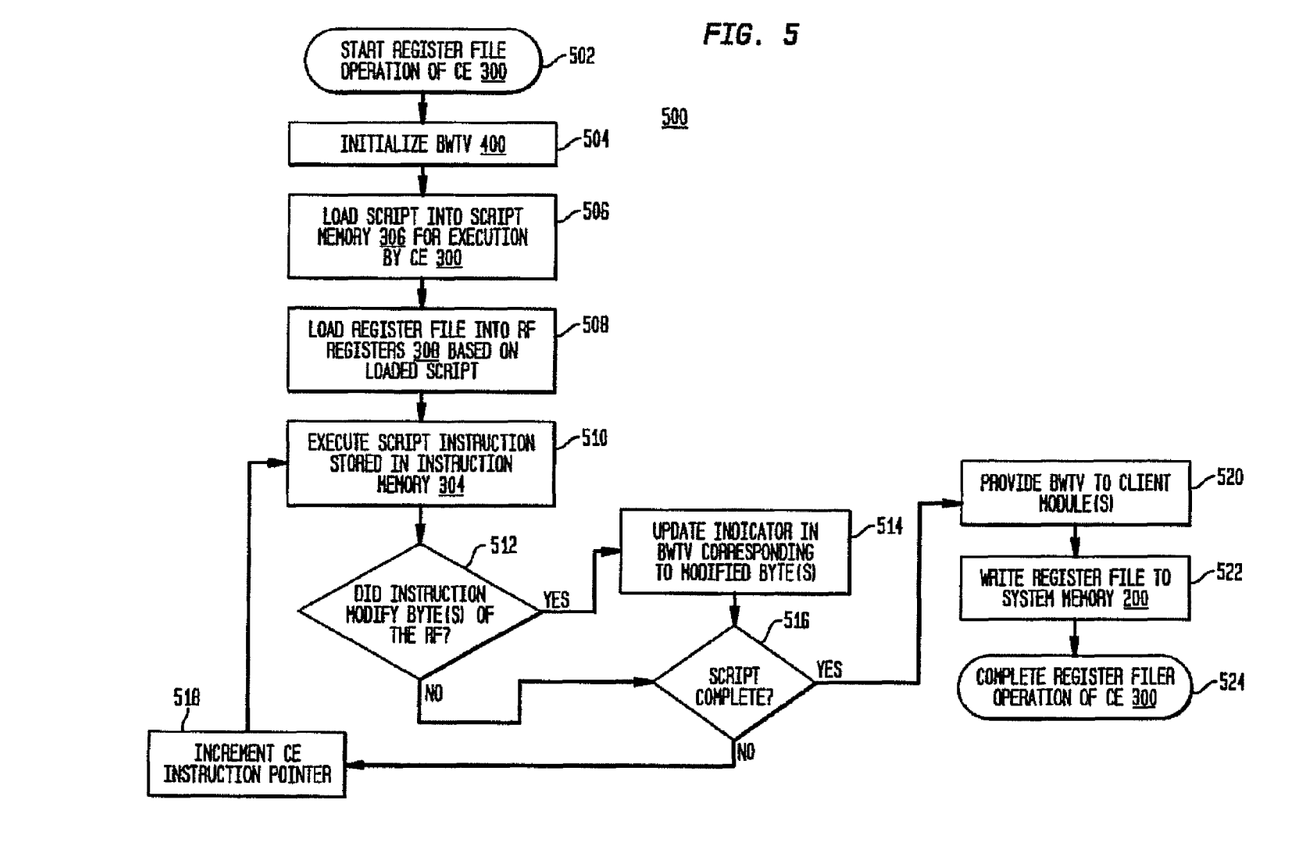
FIG. 5 shows a flow diagram of a register file operation of the CE of FIG. 3, in accordance with embodiments of the present invention.

FIG. 5 shows an exemplary flow diagram of byte written tracking method 500. At step 502, CE 300 begins an operation on a given register file. For example, at step 502, accelerator 108 might request a script operation by CE 300. At step 504, CE 300 initializes BWTV 400, for example by clearing indicators 402(1)-402(N) to default values. At step 506, accelerator 108 loads a desired script into script memory 306 from system memory 200, for execution by CE 300. At step 508, a desired register file is loaded from system memory 200 into RF registers 308 based on the script loaded at step 506. At step 510, CE processing unit 310 executes an instruction of the loaded script based on instructions stored in instruction memory 304 and the register file loaded into RF registers 308.

At step 512, if the given instruction modified one or more bytes of the register file, at step 514, the corresponding ones of indicators 402(1)-402(N) are set to indicate the modified one or more bytes of the register file, and method 500 proceeds to step 516. If, at step 512, the given instruction did not modify any bytes of the register file, method 500 proceeds to step 516.

At step 516, if the script is not yet complete, at step 518, an instruction pointer of CE processing unit 310 is updated, and at step 510, an subsequent instruction of the script is executed. At step 516, if the script is complete, then at step 520, BWTV 400 is provided to accelerator 108. As described herein, accelerator 108 might employ BWTV 400 to determine subsequent processing of one or more tasks corresponding to the script operation. At step 522 the updated register file might be written from RF registers 308 to system memory 200. At step 524, the script operation of CE 300 completes.

Thus, described embodiments might maintain data coherency of one or more local caches of the network processor 100 based on BWTV 400 after each script is executed by CE 300. A data flow or ordering of processing of a task by various of the processing modules of network processor 100 might be modified based on the updated register file, or data corresponding to a task (e.g., PDU data) might be updated based on the updated register file. CE 300 might employ BWTV 400 to only move updated register file data from RF registers 308 to system memory 200.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

It will be further understood that various changes in the details, materials, and arrangements of the parts which have been described and illustrated in order to explain the nature of this invention might be made by those skilled in the art without departing from the scope of the invention as expressed in the following claims.

We claim:

1. A method of controlling processing flow in a network processor having one or more processing modules, the method comprising:

loading, by a given one of the processing modules, a script into a compute engine of the network processor, the script comprising one or more instructions for execution by the compute engine;

loading, by the given one of the processing modules, information into a register file of the compute engine, the information including one or more operands for the one or more instructions of the script;

initializing a tracking vector of the compute engine to a default value, wherein the tracking vector comprises a data structure that includes N indicators, wherein each indicator corresponds to one of N portions of the register file which are tracked by the compute engine, wherein the tracking vector is stored in a memory location that is independent and separately addressable from memory locations in which said information is stored in the register file;

executing, by the compute engine, the one or more instructions of the script, wherein the one or more instructions operate on the one or more operands in the register file;

modifying, by the compute engine, one or more portions of the register file with updated data responsive to the executed script;

tracking, by the compute engine, modified portions of the register file, wherein tracking comprises the compute engine setting a value of one or more of the N indicators of the tracking vector to indicate which of the one or more portions of the register file have been modified with updated data;

providing, by the compute engine, the tracking vector without the updated register file to the given one of the processing modules;

determining, by the given one of the processing modules, further processing responsive to the tracking vector; and moving modified data between the compute engine and an external memory via at least one sub-cache in a system cache of a shared memory.

2. The method of claim 1, further comprising:

loading the script into a script memory of the compute engine;

reading, by the compute engine, the script from the script memory; and reading an instruction of the script from an instruction memory of the compute engine.

3. The method of claim 1, wherein each of the N portions of the register file which are tracked by the compute engine is 1 byte.

4. The method of claim 1, wherein each indicator comprises a 1-bit flag.

5. The method of claim 1, further comprising:

receiving one or more packets from a communication link with the network processor;

generating, by the network processor, one or more tasks corresponding to each of the received packets;

storing, by the network processor, data corresponding to each received packet in at least one of a system cache and at least one external memory of the network processor;

receiving, by one of the processing modules of the network processor, a given task for operation; and requesting, by the one of the processing modules, an operation by the compute engine for the script corresponding to the received task.

6. The method of claim 1, wherein the further processing comprises at least one of:

maintaining data coherency of one or more local caches of the network processor;

modifying a data flow of the task within the network processor; and modifying data corresponding to the task.

7. The method of claim 1, wherein each instruction comprises variable width ALU (arithmetic logic unit) data and variable width predicate data.

8. The method of claim 1, wherein the compute engine processes two or more scripts in parallel.

9. The method of claim 1, wherein the tracking vector is stored in a memory location of a memory of the compute engine which is separate from the register file.

10. The method of claim 1, wherein the tracking vector is stored in one or more reserved registers of the register file.

11. A non-transitory machine-readable medium, having encoded thereon program code, wherein, when the program code is executed by a machine, the machine implements a method of controlling processing flow in a network processor having one or more processing modules, the method comprising:

loading, by a given one of the processing modules, a script into a script memory of a compute engine of the network processor, the script comprising one or more instructions for execution by the compute engine;

loading, by the given one of the processing modules, information into a register file of the compute engine, the information including one or more operands for the one or more instructions of the script;

initializing a tracking vector of the compute engine to a default value, wherein the tracking vector comprises a data structure that includes N indicators, wherein each indicator corresponds to one of N portions of the register file which are tracked by the compute engine, wherein the tracking vector is stored in a memory location that is independent and separately addressable from memory locations in which said information is stored in the register file;

executing, by the compute engine, the one or more instructions of the script, wherein the one or more instructions operate on the one or more operands in the register file;

modifying, by the compute engine, one or more portions of the register file with updated data responsive to the executed script;

tracking, by the compute engine, modified portions of the register file, wherein tracking comprises the compute engine setting a value of one or more of the N indicators of the tracking vector to indicate which of the one or more portions of the register file have been modified with updated data;

providing, by the compute engine, the tracking vector without the updated register file to the given one of the processing modules; and determining, by the given one of the processing modules, when to direct instructions to a separate processing module in the network processor.

12. The non-transitory machine-readable medium of claim 11, wherein the method of controlling processing flow in the network processor further comprises:

receiving one or more packets from a communication link of the network processor;

generating, by the network processor, one or more tasks corresponding to each of the received packets;

storing, by the network processor, data corresponding to each received packet in at least one of a system cache and at least one external memory of the network processor;

receiving, by one of the processing modules of the network processor, a given task for operation;

requesting, by the processing module, an operation by the compute engine for the script corresponding to the received task; and determining, by the given one of the processing modules, further processing of the received task based on the provided tracking vector.

13. The non-transitory machine-readable medium of claim 11, wherein the further processing comprises at least one of:

maintaining data coherency of one or more local caches of the network processor;

modifying a data flow of the task within the network processor; and modifying data corresponding to the task.

14. The non-transitory machine-readable medium of claim 11, wherein the tracking vector is stored in a memory location of a memory of the compute engine which is separate from the register file.

15. A network processor comprising:

an interface coupled to a communication link, the interface configured to receive one or more packets;

a plurality of processing modules connected to a switch within the network processor, one of the plurality of processing modules configured to generate one or more tasks in response to the one or more packets;

a shared system cache coupled to the plurality of processing modules via the switch and a speculative read interface; and at least one external memory coupled to the shared system cache via a memory interface, the shared system cache and external memory configured to store data corresponding to each received packet;

wherein a given one of the processing modules is configured to:

receive a task from among the one or more tasks, the task identifying a script for operation in a compute engine;

load the script into a script memory of the compute engine, the script comprising one or more instructions for execution by the compute engine; and load information into a register file of the compute engine, the information including one or more operands for the one or more instructions of the script;

wherein the compute engine is configured to:

initialize a tracking vector to a default value, wherein the tracking vector comprises a data structure that includes N indicators, wherein each indicator corresponds to one of N portions of the register file which are tracked by the compute engine, wherein the tracking vector is stored in a memory location that is independent and separately addressable from memory locations in which said information is stored in the register file;

read the script in the script memory to identify at least one instruction stored in an instruction memory;

execute the at least one instruction, and modify one or more portions of the register file with updated data responsive to the executed instruction;

track modified portions of the register file, wherein tracking comprises setting a value of one or more of the N indicators of the tracking vector to indicate which of the one or more portions of the register file have been modified with updated data; and provide the tracking vector without modified portions of the register file to the given one of the processing modules, wherein the given one of the processing modules is further configured to determine further processing of the received task based on the tracking vector, the further processing including modifying data responsive to the modified portions of the register file.

16. The network processor of claim 15, wherein the compute engine comprises one or more arithmetic logic units and one or more predicate execution units.

17. The network processor of claim 15, wherein the one or more processing modules comprise at least one of control processors comprising Reduced Instruction Set Computing (RISC) central processing units (CPUs) and hardware accelerators;

wherein the system cache comprises an embedded DRAM; and wherein the at least one external memory comprises a double data rate (DDR) DRAM coupled to the network processor.

18. The network processor of claim 15, wherein:

the communication link comprises at least one of a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, and a Serial Rapid I/O ("SRIO") link.

19. The network processor of claim 15, wherein the network processor is implemented as an integrated circuit chip.

20. The network processor of claim 15, wherein the tracking vector is stored in a memory location of a memory of the compute engine which is separate from the register file.

* * * * *